United States Statutory Invention Registration [19]

[11] Reg. Number: H36

Smith [45] Published: Mar. 4, 1986

[54] ELECTROPLATING PROCESS WITH INERT ANODES

[75] Inventor: Craig G. Smith, North Plainfield, N.J.

[73] Assignee: AT&T Bell Laboratories, Murray Hill, N.J.

[21] Appl. No.: 717,601

[22] Filed: Apr. 1, 1985

Related U.S. Application Data

[63] Continuation of Ser. No. 646,500, Sep. 4, 1984, abandoned, which is a continuation of Ser. No. 602,098, Apr. 20, 1984, abandoned, which is a continuation of Ser. No. 521,976, Aug. 11, 1983, abandoned, which is a continuation of Ser. No. 310,611, Oct. 13, 1981, abandoned.

[51] Int. Cl.[4] ..... C25D 3/38; C25B 15/00

[52] U.S. Cl. ..... 204/52 R; 204/234; 204/235; 204/DIG. 13

[58] Field of Search ..... 204/237, 238, 232, 239, 204/240, 241, DIG. 13, 233, 235, 236, 234, 45.1, 47, 49, 52 R, 106, 108

[56] References Cited

U.S. PATENT DOCUMENTS

| | | | |
|---|---|---|---|
| 2,449,422 | 9/1948 | Smith | 204/49 |
| 3,691,026 | 9/1972 | Durrwachter et al. | 204/28 |
| 3,966,890 | 6/1976 | Parker et al. | 204/106 X |
| 3,994,789 | 11/1976 | Langer | 204/108 |
| 4,045,304 | 8/1977 | Tezuka | 204/49 |
| 4,181,580 | 1/1980 | Kitayama et al. | 204/28 |
| 4,269,670 | 5/1981 | Smith | 204/15 |
| 4,282,082 | 8/1981 | Cook et al. | 204/237 |

FOREIGN PATENT DOCUMENTS

| | | | |
|---|---|---|---|
| 2067595 | 7/1981 | United Kingdom | 204/DIG. 13 |
| 55-122898 | 9/1980 | Japan | 204/291 |

OTHER PUBLICATIONS

George Jernstedt, The Electrochem. Soc., Preprint 82—17, pp. 177-193, (1942).

A. A. Lowenheim, "Modern Electroplating", pp. 165-223, (1974).

Anthony Ralston et al., "Mathematical Methods", pp. 110-120, (1960).

*Primary Examiner*—John Terapane

*Assistant Examiner*—Howard J. Locker

*Attorney, Agent, or Firm*—Eugen E. Pacher

[57] ABSTRACT

The invention comprises improvements in inert anode electroplating processes that make possible the utilization of typically inexpensive and otherwise advantageous cation-yielding compounds for replenishing the plating bath, compounds that typically are not well suited for such use in prior art systems due to their relatively low dissolution rate which typically requires their use in powder form, and the tendency of the powder particles to aggregate. Exemplary applications for the improved plating process are in Cu-, Ni-, and Pd-plating, and exemplary cation-yielding compounds or CuO, NiO, PdO, $Cu(OH)_2$,$Ni(OH)_2$, and $Pd(OH)_2$. The improvements according to the invention comprise agitating the powder/electrolyte mixture or slurry in a reactor vessel separate from the plating tank, and maintaining the cation concentration in the plating tank within predetermined limits. Agitation typically requires power input to the slurry of at least about 2.5 watt/liter of slurry, with a preferred range of power for CuO of about 10 $\mu$m average particle size and concentration between about 5 and about 200 gram/liter being between about 5 and about 200 watt/liter of slurry. Schemes for maintaining the cation concentration in the plating bath within predetermined limits are described, and include controlling the rate of addition of cation-yielding compound to the slurry, and/or controlling the flow rate of electrolyte between reactor and plating tank.

9 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

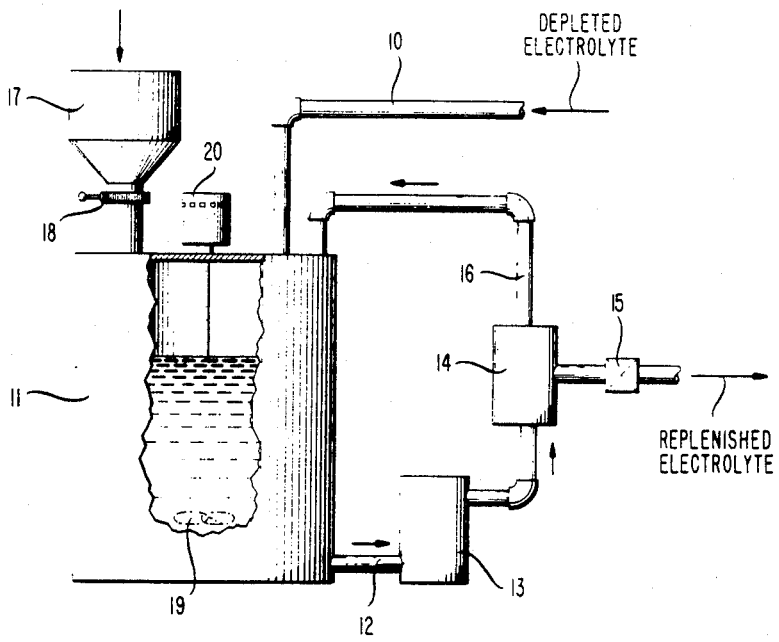
DEPLETED
ELECTROLYTE
10
17
20
18
16
15
14
11
REPLENISHED
ELECTROLYTE
13
19
12

ELECTROPLATING PROCESS WITH INERT ANODES

This application is a continuation of application Ser. No. 646,500, filed Sept. 4, 1984, now abandoned, which was a continuation of application Ser. No. 602,098, filed Apr. 20, 1984, now abandoned, which was continuation of application Ser. No. 521,976, filed Aug. 11, 1983, now abandoned, which was continuation of application Ser. No. 310,611, filed Oct. 13, 1981, now abandoned.

FIELD OF THE INVENTION

This invention pertains to the field of electroplating with inert anodes.

BACKGROUND OF THE INVENTION

Electroplating involves deposition of a metal layer onto a solid surface by means of electrolysis. It is carried out in a bath which may comprise fused salts or solutions of various kinds. In commercial practice aqueous solutions are typically used.

Most electroplating, e.g., most copper plating, is done by methods involving consumable electrodes. See, for instance, *Modern Electroplating,* A. A. Lowenheim, editor, The Electrochemical Society, Inc., Princeton, N.J., pp. 165–223, Third Edition. In consumable electrode plating processes, metal ions, derived typically from a salt, e.g., $CuSO_4$, are caused to be deposited on a cathode in contact with the plating solution, and the corresponding number of ions enters the bath through dissolution of a metal, e.g., copper, anode that is also in contact with the bath. The overall process thus comprises a transfer of metal from the anode to the cathode.

Some metals, however, are typically plated by methods involving inert or insoluble anodes, i.e., anodes that are essentially not consumed in the plating process, and that thus are not substantial sources of cations for the plating process. Among these metals are chromium and gold. In these processes the concentration of metal ions in the plating bath is maintained within the appropriate range by addition to the bath of compounds that yield the appropriate metal ion upon dissolution of the compound in the bath. For instance, in chromium plating, the chromium is introduced into the bath in the form of $CrO_3$, which is readily soluble in water. Similarly, gold plating is frequently carried out with inert anodes in cyanide solution, with the gold typically added in the form of AuCN or $KAu(CN)_2$. See, for instance, Y. P. Okinaka et al, U.S. Patent Application, Ser. No. 104,181, filed Dec. 17, 1979 for "Method of Replenishing Gold in Plating Baths."

The substitution of an inert (insoluble) anode plating process for a process using consumable electrodes often offers substantial advantages. For instance, in copper plating, e.g., in the manufacture of printed circuit boards, soluble copper anodes are currently used in systems operating typically at current densities of about 250–450A/m$^2$, and result in typical plating times for circuit boards of 30–45 minutes. By carrying out the plating of circuit boards in a system employing insoluble anodes, product yield and uniformity of thickness of the deposit can typically be improved, and equipment maintenance be reduced. Furthermore, because of, e.g., decreased anode polarization, such a system potentially can employ higher current densities, in excess of 1000A/m$^2$, resulting in plating times that are potentially significantly shorter than those typical of consumable anode systems.

Inert anode plating processes require replenishment of cations in the electrolyte. This is typically accomplished by addition to, and dissolution in, the electrolyte of cation-yielding compounds. However, some compounds that otherwise are very advantageous cation sources tend to form, in the electrolyte, aggregates that do not readily dissolve, and for this reason usually are not considered to be useful cation sources in inert anode plating. Improvements in inert anode plating processes that permit the use of such relatively poorly soluble compounds as cation sources are thus of considerable interest.

SUMMARY OF THE INVENTION

The instant invention comprises improvements in electroplating processes involving non-consumable anodes. Such processes require replenishment of the electrolyte, typically by means of at least intermittent addition of a cation-yielding compound, typically in solid, i.e., particulate form, to the electrolyte. I have found that, under appropriate conditions, CuO can be used as cation-yielding compound in inert anode copper plating processes. CuO is relatively inexpensive and readily available. For instance, it can be precipitated from spent copper etching solutions. A copper plating process that permits use of CuO as cation source thus can result in cost reduction, in addition to helping to preserve a finite resource. The improvements comprise a method and means for prevention or substantial reduction of the aggregation of the particles of the cation-yielding compound added to the electrolyte.

The addition and subsequent dissolution of the cation-yielding particles tyically occur in a reactor vessel distinct from the plating tank. In accordance with the invention, aggregation of the particles is prevented or reduced by sufficiently agitating the slurry in the reactor for at least part of the time of plating current flow. I have found that insufficient agitation can actually increase the aggregation tendency of cation-yielding powders, for instance, of CuO. Thus, there typically exists a minimum degree of slurry agitation, i.e., of input of mechanical power to the reactor. In a copper plating system using CuO particles of about 10 μm average size, I have found that an input of mechanical power to the reactor of about 5–200 watts/liter of slurry, for slurry of about 5–200 gram/liter solute concentration, essentially completely eliminates caking of the solute particles. I consider a minimum power input to be typically about 2.5 watt/liter of slurry for systems using practical solute concentrations. For CuO powder of about 10 μm particle size, the preferred solute concentration is between about 10 gram/liter and about 40 gram/liter, and the preferred power input between about 5 and about 20 watt/liter of slurry.

The improvements further comprise maintaining the cation concentration in the plating bath within predetermined limits, e.g., by adjusting the rate of flow of electrolyte between plating tank and reactor, and/or by adjusting the amount of the cation-yielding compound added to the electrolyte.

The instant improved electroplating method allows use of cation-yielding compounds that typically cannot be used conveniently in prior art systems because of their aggregation tendencies. Incorporation of the instant improvements into inert anode plating systems can result in, inter alia, substantial economy since at least some of the compounds whose use as cation source is thus made possible are inexpensive and readily available. Furthermore, plating systems comprising the instant improvements typically can be operated with substantially constant bath chemistry, are easily automated, pose little or no maintenance problems, allow use of high current densities because of the absence of anode passivation, and allow close control of the process due to the inherent dimensional stability of such systems. Examples of metals that can advantageously be plated with systems according to the invention are copper, nickel, and palladium, with copper plating being the preferred application.

BRIEF DESCRIPTION OF THE DRAWING

The FIGURE schematically shows the cation-replenishment part of an electroplating system according to the invention.

DETAILED DESCRIPTION

The instant invention comprises improvements in electroplating processes utilizing insoluble anodes. A preferred application of the invention is in copper plating from an acid bath, e.g., in the manufacture of circuit board. Other exemplary plating processes to which the instant invention can advantageously be applied are, for instance, nickel and palladium plating from acid baths, and palladium plating from alkaline baths.

In these exemplary plating processes, as well as in others not specifically referred to here, it is usually necessary to maintain the cation concentration in the plating bath within certain limits. Since cations are constantly being removed from the bath through cathodic deposition, it is necessary to add cations to the bath during electroplating. This can conveniently be done by addition to the electrolyte of a compound, or of compounds, that yield the cation upon dissolution in the electrolyte. In many cases the oxide or hydroxide of the metal to be plated, e.g., CuO, NiO, PdO, $Cu(OH)_2$, $Ni(OH)_2$, $Pd(OH)_2$, forms in principle an advantageous cation source, since these compounds typically are readily and economically obtainable, and frequently their use results in maintenance of a substantially constant bath chemistry. For instance, in sulfuric acid/copper sulfate plating baths, the predominant reaction at insoluble anodes is oxygen evolution with sulfuric acid formation. If copper sulfate is used to replenish the bath, the solubility of copper sulfate decreases and results in salt precipitation. On the other hand, if copper oxide (CuO) or hydroxide ($Cu(OH)_2$) is used to replenish the bath, these compounds react with the anodically formed sulfuric acid to result in a self-regulating, i.e., substantially constant, bath chemistry.

However, these otherwise advantageous cation-yielding sources typically dissolve relatively slowly in the respective electrolytes. For instance, the rate of dissolution of CuO is limited by surface kinetics and typically cannot be increased by agitation of the solution. In order to avoid the need for very large, and thus costly, reactors, it is thus typically necessary to increase the solute surface area in contact with the solvent, namely, to add the solute in form of a fine powder. Typically the average particle size is less than about 50 μm, preferably less than about 25 μm, in order to yield practical dissolution rates, but typically not less than about 0.5 μm, to facilitate filtering of undissolved particles from the electrolyte prior to addition of the replenished electrolyte to the plating tank.

Using powders of sufficiently small particle size thus can result in practical dissolution rates. However, if the solute particles are allowed to settle in the electrolyte, aggregation tyically results, leading, inter alia, to a large decrease in dissolution rate. For instance, in sulfuric acid/copper sulfate copper plating electrolytes, conversion of CuO to the sulfate continues even after the solution is saturated with copper sulfate. As a result, copper sulfate bridges form between aggregated particles, resulting in a compact precipitate that not only has a negligible dissolution rate but also poses severe maintenance problems. This caking or crystallization process in the above copper plating method is accelerated by heating of the solution due to the exothermic reaction of CuO with the acid. The solubility of copper sulfate in $H_2SO_4$ increases with temperature, thus, when the solution cools, supersaturation results and the formation of copper sulfate bridges is accelerated. Minor agitation of a slurry often increases caking, as the particles can become more tightly packed thereby. This occurs for instance with CuO particles.

The instant invention addresses this aggregation problem, and has as an objective the improvement of electroplating processes that employ inert anodes and cation-yielding compounds having relatively low dissolution rates in the respective electrolytes. This objective is achieved, inter alia, by utilizing means for transferring mechanical power, in the form of fluid motion, to the electrolyte-particle mixture (slurry) in the reactor. By "reactor" I mean the vessel in which the dissolution of the cation-yielding compound takes place. A further aspect of the inventive method is the appropriate control of the addition of the cations to the plating bath.

Replenishment of depleted electrolyte, i.e., electrolyte of relatively low cation concentration, with cations is advantageously carried out in a vessel separate from the plating tank. The FIGURE schematically shows such a replenishment system. The depleted electrolyte from the plating tank reaches vessel 11 through pipe 10. The liquid is drawn from the replenishment vessel by means of pipe 12 and pump 13. This liquid enters filter 14, with part of the liquid being returned to the vessel by means of pipe 16, and an appropriate quantity of replenished liquid, i.e., electrolyte of higher cation concentration than depleted electrolyte, is returned to the plating tank after passing through control valve 15. An appropriate cation-yielding compound is contained in hopper 17 and admitted into the replenishment vessel at an appropriate rate by means of control valve 18. Stirrer 19, driven by motor 20, serves to agitate the slurry formed by addition of the cation-yielding compound in powder form to the liquid drawn from the plating bath.

For instance, an exemplary sulfuric acid/copper sulfate copper plating system comprises an 80 liter polypropylene plating tank, an 80 liter polypropylene reactor vessel, PVC plumbing, and a PVC agitator, namely, a paddle wheel. The filter used in the system is a Dyna-Sep Module No. H4211AD01 tubular filter which is capable of removal from the electrolyte of particles sized 0.2 μm or above. The anode is a metal oxide coated titanium sheet (see for instance U.S. Pat. No. 4,269,670, issued May 26, 1981 to C. G. Smith). The exemplary plating system operates with 200 A of plating current, and requires dissolution of approximately 297 grams of CuO per hour. The flow rate of electrolyte between tank and reactor is approximately 200 ml/min.

As was pointed out above, minor agitation of the slurry in the reactor can actually increase the aggrega-

BEST AVAILABLE COPY tion of solute. Thus a minimum amount of agitation, i.e., input of mechanical energy into the reactor, is required. For instance, I found that CuO caked onto a paddle wheel rotated at 10 rpm, but not onto the same wheel rotated at 56 rpm. The minimum power input required to prevent aggregation typically is a function of solute concentration, but can also depend on the details of the system, e.g., the nature of bath and solute, particle size, and bath temperature, and thus determination of the minimum value for any given system typically may require minor routine experimentation. An aproximate minimum value in systems using practical solute concentration is about 2.5 watts/liter of slurry in the reactor. The mechanical power can be supplied to the medium in the reactor by any appropriate agitating means, e.g., by means of a stirrer or vibrator, by means of pump-driven turbulent flow, or, in case some minor caking does take place, by means of a grinding device, e.g., a pebble mill.

In the exemplary system described above, the slurry of CuO and $H_2SO_4/CuSO_4$ is pumped at high velocity (about 150 cm/sec) by means of a 1 horsepower centrifugal pump through the tubular filter. This results in an input of about 750 watts into about 80 liters of slurry. This is typically sufficient to prevent solute aggregation. However, a paddle wheel is provided to serve as auxiliary agitating means.

The high-velocity flow not only serves to agitate the slurry in the reactor, but also improves the operation of the tubular filter. In the filter used in the exemplary system, the major portion of the fluid entering the input port of the filter flows straight through and leaves the filter through the exit port, to be returned to the reactor. Only a small fraction of the fluid flows through the wall of the filter and constitutes the filtered output, which is added to the plating bath. The shear generated by the high-velocity fluid flow through the filter tends to clean the inside wall of the filter and thereby avoids plugging. Periodic back-flushing with small volumes of electrolyte further prevents plugging of the tubular filter used in the exemplary system.

A system according to the invention can also be operated without a filter, if one or more settling tanks are provided. In such a system, the fluid exiting from the reactor vessel enters another vessel of sufficient volume to result in a residence time of the fluid therein that is at least comparable to the settling time of the particles suspended in the fluid. The fluid flowing from the settling vessel can be either directly returned to the plating tank or be caused to flow through one or more further settling vessels, depending on the efficiency of dissolution and particle removal action in the first settling vessel. Settling tanks are well known in the art, and therefore no further details will be given here.

In electroplating, it is typically required to maintain the cation concentration of the bath within predetermined limits. For instance, in the case of additive-free acid copper plating baths, the $CuSO_4$-concentration typically is maintained within about $\pm 8$ % of the nominal value. In order to achieve the required approximate constancy of cation concentration, the rate of addition of cations to the plating bath is typically controlled in inert anode plating systems according to the invention. There are many ways of implementing such control, typically involving controlling the flow rate of high-concentration electrolyte from the reactor to the plating bath, and/or control of the rate of addition of cation-yielding compound to the electrolyte in the reactor.

The amount of cation-yielding compound required to replace the cations removed from the bath at the cathode is determined by the plating current used. This fact can be used to control the cation concentration in the bath. For instance, the amount of charge transferred per unit time can be measured with the aid of a coulometer, whose output is then used to, e.g., control the flow rate of electrolyte from the reactor to the bath. It is also possible to monitor the cation concentration directly, e.g., by means of a colorimeter or a conductance meter, and to use the thus obtained information to control the rate of cation addition to the bath.

The dissolution rate of the cation-yielding compound in the electrolyte has to be taken into account in the design of systems according to the invention. However, since this rate typically depends not only on the compound, but also on its detailed nature, e.g., source, and particle size, as is exemplified by the date shown in Table I below, as well as on, e.g., the cation concentration in the electrolyte, it is typically necessary to determine the rate for a projected system by routine experiment.

This point is illustrated by the following experimental results. Dissolution rates were determined for five different sources of copper ions. The powders, of average particle size about 10 $\mu$m, were dissolved under vigorous agitation in 0.6M $CuSo_4$/1M $H_2SO_4$ solution. Enough cation-yielding compound was added to the solution to result in a 0.25M increase in Cu ion concentration upon complete dissolution, and the time to dissolution determined. The results are listed in Table I, wherein "etch 1" refers to an ammonium chloride etch used to etch Cu-plated circuit board and the like, and from which the CuO was reclaimed. Similarly, "etch 2" refers to a $H_2O_2/H_2SO_4$ etch, from which the CuO was precipitated.

TABLE I

Dissolution Rates of Copper Salts
(0.6M $CuSO_4$/1M $H_2SO_4$, $\Delta c = 0.25$M)

| Copper Salt | Time to Dissolution |
|---|---|
| CuO (commercial source) | 180 min. |
| CuO (from etch 1) | 12 min. |
| CuO (from etch 2) | 3 min. |
| $Cu(OH)_2$ (commercial source) | 0.25 min. |
| $CuSO_4.5H_2O$ (commercial source) | 3 min. |

In systems according to the invention the reactor can be either continuously or intermittently charged with the cation-yielding compound. In the former case, the rate of powder addition to the slurry is typically adjusted to be less than or equal to the rate of powder dissolution in the reactor to avoid any build-up of undissolved powder in the reactor. In the latter case the charge size, and the interval between charges, are typically chosen to result in dissolution of the previously added powder before addition of fresh powder.

Also, in continuous-charge systems the rate of addition of cation-yielding powder to the reactor is advantageously controlled to result in an addition of cations to the bath substantially equal to the rate of removal of cations from the bath through deposition at the cathode. For instance, since for CuO the relevant conversion factor is 53.6 A·hr/mole, a plating current of one ampere requires a charging rate of 0.0187 mole/hr, i.e., of 1.48 gm/hr. In intermittent-charge systems the average rate of addition of cation-yielding compound is advantageously controlled to substantially correspond to the average rate of cation removal from the bath, with the size and timing of the charges adjusted to result in a cation concentration in the bath within the predetermined limits.

In an exemplary acid copper-plating system comprising a 2000 liter plating tank and an 800 liter reactor vessel, operated with 10,000 A plating current and a nominal 0.6M $CuSO_4$ concentration, addition of 14.8 kg of CuO powder at 60-minute intervals results in variation of the $CuSO_4$ concentration in the plating bath between about 0.55M and about 0.65M, when the complete charge is allowed to dissolve in the reactor, and the high-concentration electrolyte, then pumped into the plating tank to replenish the bath. If the plating tank holds 12,000 liter of electrolyte, then the same conditions lead to concentration variations between about 0.592M and about 0.608M.

Two other exemplary systems that closely resemble the system shown in the FIGURE, i.e., that use a tubular filter and in which the electrolyte circulation rate between bath and reactor is controlled, were evaluated. The systems have 800 liter reactors and were operated with 10,000 A plating currents. They have 2000 liter and 12,000 liter plating tanks, respectively. When adding 59.2 kg CuO batchwise at 4-hour intervals, the following results are obtained: for both bath volumes, the $CuSO_4$ concentration remains essentially constant at 0.6M if the electrolyte circulation rate is 6.35 liter/min, and varies roughly sinusoidally, with a 4-hour period, between about 0.592M and 0.608M if the circulation rate is 12 liters/min.

The above examples indicate that the choice of operating parameters greatly affects the operating conditions of a system according to the invention. Although typically a small amount of routine experimentation is required to find appropriate parameter values, the following model of a plating system can be used advantageously in the design of systems according to the invention. The material balance for the plating yields the expression $$\frac{d}{dt}(c_pV_p) = v(c_r - c_p) - \frac{I}{zF}, \quad (1)$$

and the reactor material balance yields $$\frac{d}{dt}(c_rV_r) = r - v(c_r - c_p). \quad (2)$$

The slurry concentration as a function of time is given by the expression $$w(t) = w_o - (c_r - c_{ro}) - \frac{v}{V_r}\int_o^t (c_r - c_p)dt \quad (3)$$

In these expressions, subscripts p and r refer to plating tank and reactor, respectively, whereas the subscript o signifies the initial value. t is time, c cation concentration, V tank volume, v volumetric flow between reactor and plating tank, I plating current, z the valence of the plating reaction, and F Faraday's constant. Also, r is the dissolution rate for the cation-yielding compound, and w the slurry concentration. For instance, I found that the dissolution rate for CuO from etch 1 above can be expressed as $$r = 0.11wV_r.$$

Equations 1–3 can be solved numerically, for instance by use of the Runge-Kutta-Gill algorithm (see, for instance M. J. Romanelli, *Mathematical Methods for Digital Computers,* Wiley & Sons, N.Y., 1960, pp. 110–120), to determine appropriate values of important system parameters, e.g., the volumes of the plating and slurry tanks, the total plating current, and the amount of cation-yielding compound added. The use of modelling in design is familiar to those skilled in the art, and no further details need therefore be given here.

What is claimed is:

1. Electrochemical copper deposition process comprising passing current between an anode and a cathode, both anode and cathode being maintained in contact with an aqueous electrolyte in a plating tank, the electrolyte comprising Cu ions, the electrolyte contained in the plating tank to be referred to as the plating bath, the process also comprising adding Cu ions to the plating bath,

CHARACTERIZED IN THAT the anode is an anode of the nonconsumable type and the Cu ions are added to the plating bath by a procedure comprising contacting CuO powder with electrolyte.

2. Process of claim 1, wherein the procedure for adding Cu ions to the plating bath comprises admitting electrolyte having a first concentration of Cu ions into a reactor vessel, contacting the electrolyte in the reactor vessel with powder comprising CuO powder, removing electrolyte having a second concentration of Cu ions from the reactor vessel and adding the removed electrolyte to the plating bath, the second concentration of Cu ions being higher than the first.

3. Process of claim 2, wherein the procedure for adding Cu ions further comprises forming a slurry in the reactor vessel, the slurry comprising the powder and the electrolyte, the slurry being agitated for at least a part of the time of current passage.

4. Process of claim 3, wherein agitation of the slurry results in an input of mechanical power to the slurry of between about 5 watts/liter of slurry and about 20 watts/liter of slurry.

5. Process of claim 4, wherein the powder consists substantially of CuO powder having an average particle size between about 0.5 μm and about 50 μm, the CuO powder being introduced into the reactor vessel either intermittently or substantially continuously during at least a part of the time of current passage.

6. Process of claim 5, further comprising adjusting the rate of introduction of CuO powder into the reactor vessel in response to the output of Cu ion concentration monitoring means comprising optical means, to maintain the Cu ion concentration in the plating bath within predetermined limits.

7. Process of claim 1, wherein the anode comprises metal oxide coated titanium.

8. Process of claim 3, wherein agitation is by means of a mechanical stirrer submerged in the slurry in the reactor.

9. Process of claim 3, further comprising causing the electrolyte removed from the reactor to flow through at least one settling tank prior to adding it to the plating bath.

* * * * *